(12) United States Patent
Kataoka et al.

(10) Patent No.: US 7,843,776 B2
(45) Date of Patent: Nov. 30, 2010

(54) OPTICAL DISK RECORDING/REPRODUCING APPARATUS AND SEEK CONTROL METHOD THEREOF

(75) Inventors: Takeyoshi Kataoka, Yokohama (JP); Nobuhiro Takeda, Tokyo (JP); Tsuyoshi Toda, Kodaira (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 1072 days.

(21) Appl. No.: 11/500,442

(22) Filed: Aug. 8, 2006

(65) Prior Publication Data

US 2007/0217301 A1 Sep. 20, 2007

(30) Foreign Application Priority Data

Nov. 28, 2005 (JP) ............................. 2005-342045

(51) Int. Cl.
*G11B 7/00* (2006.01)
(52) U.S. Cl. .................. 369/44.28; 369/53.28
(58) Field of Classification Search ................... None
See application file for complete search history.

(56) References Cited

U.S. PATENT DOCUMENTS

| | | | |
|---|---|---|---|
| 4,914,725 A | 4/1990 | Belser | |
| 5,161,140 A * | 11/1992 | Terada | 369/44.28 |
| 5,442,604 A | 8/1995 | Osada | |
| 5,475,663 A * | 12/1995 | Ogino | 369/44.28 |
| 5,648,947 A * | 7/1997 | Hamaguchi et al. | 369/44.28 |
| 6,314,066 B1 | 11/2001 | Hong et al. | |
| 6,721,245 B1 | 4/2004 | Yamashita et al. | |
| 2004/0170093 A1* | 9/2004 | Kamiya | 369/44.25 |
| 2004/0196767 A1* | 10/2004 | Sameshima | 369/53.28 |

FOREIGN PATENT DOCUMENTS

| | | |
|---|---|---|
| CN | 1959820 | 5/2007 |
| JP | 3-278322 | 12/1991 |
| JP | 5-151584 | 6/1993 |
| JP | 09-102135 | 4/1997 |
| JP | 2001-202635 | 7/2001 |
| JP | 2002-358663 | 12/2002 |
| JP | 2005-285216 | 10/2005 |

* cited by examiner

*Primary Examiner*—Paul Huber
(74) *Attorney, Agent, or Firm*—Antonelli, Terry, Stout & Kraus, LLP.

(57) ABSTRACT

For achieving pulling operation into tracking servo during seek operation at high-speed and with stability, in timing thereof, even on an optical disk forming lands and grooves on a recording surface thereof, in a seek control method, according to the present invention, for moving an optical spot onto an arbitrary track through movement of an optical pickup 110 into the radial direction on the optical disk forming the lands and the grooves, thereby forming a track on the recording surface thereof, in particular, in the seek operation, measurement is made on a period of a tracking error (TE) signal generated due to the movement in the radial direction, and a time point when the measured period of the tracking error signal exceeds a predetermined value is determined to be a starting point for pulling the optical spot of the optical pickup into the track, through the tracking servo, thereby pulling it selectively, into either one of the land and the groove building up the track.

5 Claims, 9 Drawing Sheets

FIG.10

OPTICAL DISK RECORDING/REPRODUCING APPARATUS AND SEEK CONTROL METHOD THEREOF

BACKGROUND OF THE INVENTION

The present invention relates to an optical disk recording/reproducing apparatus and also a seek control method thereof, for enabling to record and reproduce information onto/from an optical disk having a land and a groove formed on recording surface thereof, and in particular, it relates to an optical disk recording/reproducing apparatus and a seek control method thereof, for enabling a seek operation of moving an optical spot in a radial direction of the disk towards to a track desired.

An optical disk, such as, CD or DVD, etc., for example, representatively, is widely used, as an information recording medium of non-contact, a large memory capacity and a low cost, and also of enabling data access at high speed, in particular, for the purpose of recording/reproducing digital audio data and/or digital video data, and further as a data recording medium for use in a personal computer. In particular, in recent years, so-called a re-writable optical disk is also used widely, such as, DVD-RAM (Digital Versatile Disc of Random Access Memory Type), for example.

Within an optical disk recording/reproducing apparatus for conducting recording or reproducing onto/from such the optical information medium, an acceleration pulse is generated for moving an optical spot from an optical pickup into the radial direction of the disk, in other words, crossing or traversing tracks towards an objective or target track, when changing the track to be conducted recording or reproducing thereon/from, thereby moving an optical pickup including an objective lens therein; i.e., so-called a seek control. However, in general, such the seek control is composed of the following three (3) stages: i.e., an acceleration stage of applying the acceleration pulse onto a driving mechanism of the optical pickup; a constant speed stage of keeping moving velocity of the optical pickup at a desired value; and further a deceleration stage of applying a deceleration pulse so that the moving velocity of the optical pickup comes down to be near to zero (0) at the target track. And, after completing of the seek control, a track following control is carried out, again, for bringing the optical spot of the optical pickup to follow the track, through a tracking servo system, within the optical disk recording/reproducing apparatus, and thereby conducting recording/reproducing on the target track.

By the way, for the purpose of executing a drawing or pulling operation onto the target track in short time and with stability under such the seek control, a method for controlling the moving velocity of the objective lens within a desired limit or range, when moving the seek control into a tracking control, is already disclosed, for example, in the following Patent Document 1, through compensation upon a peak value of the deceleration pulse to be applied within the deceleration stage, or pulse width thereof, upon basis of a tracking error signal during when the deceleration pulse is outputted.

On the other hand, in recent years, accompanying with an increase of recording capacity of the optical disk, as such the optical information recording medium mentioned above, also the recording density thereof becomes high in the density. Thus, narrowing is made on a pitch between the recording tracks, and for example, on a re-writable type optical disk, such as, DVD-RAM, not only a groove, but also a land is formed, spirally, between the grooves, and a single track format is adopted, i.e., the land and the groove appear alternately per one (1) rotation. On the recording track defined along those lands and grooves is recorded or reproduced the information.

Then, in the following Patent Document 2, for example, is already known a seek control method for inhibiting the generation of an overshoot, etc., so as to narrow the pitch between the recording tracks, by taking ill influences into the consideration, which are caused due to time delay in detection when generating a track traversing pulse up to control of the optical spot, which is conducted at the timing of a sampling clock, thereby achieving a stable pulling operation into the tracking control.

Further, for example, in the following Patent Document 3 is already known a tracking control apparatus and a method thereof, wherein detection is made on the movement of a beam spot into the disk radial direction from a phase relationship between a tracking signal and a signal, which is obtained through digitizing an amplitude detection signal produced by a reflection light, and control is made on a brake in moving direction of the beam spot, when detecting that the beam spot crosses the track at the scanning position thereof, after change from the seek operation into the tracking operation, thereby achieving a stable pulling operation and a high-speed of the tracking.

[Patent Document 1] Japanese Patent Laying-Open No. Hei 09-102135 (1997);

[Patent Document 2] Japanese Patent Laying-Open No. 2005-285216 (2005); and

[Patent Document 3] Japanese Patent Laying-Open No. 2001-202635 (2001).

However, with such the conventional arts as mentioned above, in particular, the methods and the apparatuses described in the Patent Documents 1 and 2, the correction or compensation is made upon the peak value and/or the pulse width in a series of deceleration pulses, or upon the deceleration pulse for the time delay in detection thereof; however, any one of those takes the timing for starting the pulling operation into the tracking servo control under the tracking serve system into the consideration thereof. Further, in case when recording or reproducing information along those lands and grooves, which are formed spirally on the recording surface, such as, DVD-RAM, for example, the difference is very important, that the desired track, onto which the optical spot should be moved, is the groove or the land, for the seek operation of moving the optical spot into the radial direction on the optical disk, including an operation shifting into the tracking servo thereafter. Nor sufficient consideration is paid for the timing for switching from the seek operation into the tracking operation, within the tracking control apparatus and the method thereof, which are described in the Patent Document 3 mentioned above.

Thus, in particular, on the information recording medium, forming the lands and grooves spirally on the recording surface thereof, such as DVD-RAM, for example, the condition for brining the tracking error signal to be stable differs from, during the tracking operation thereafter, depending on the fact that the tracking servo is taken onto the land or the groove when conducting the pulling operation within the seek operation.

Then, according to the present invention, accomplished by taking the drawbacks of the conventional arts mentioned above into the consideration thereof, i.e., an object thereof is to provide a seek control method for enabling the pulling into the tracking servo, stably in the timing thereof, in particular, within the seek operation for moving an optical beam onto the target track traversing the tracks, in spite of the difference that the target track is the land or the groove, and further to provide an optical disk recording/reproducing apparatus enabling the seek operation, at high-speed and with stability, while adapting such the method therein.

BRIEF SUMMARY OF THE INVENTION

For accomplishing such object mentioned above, according to the present invention, firstly there is provided a seek control method of an optical disk recording/reproducing apparatus, for moving an optical spot onto an arbitrary track, moving an optical pickup into a radial direction thereof to an optical information recording medium, forming lands and grooves spirally on an information recording surface thereof, comprising the following steps of: measuring a period of a tracking error signal, which is generated upon reflection of an optical spot from said optical pickup with movement into a radial direction thereof, when conducting a seek control; determining a starting point for pulling the optical spot of said optical pickup into, through a tracking servo, when the measured period of the tracking error signal fulfills a predetermined condition; and pulling the optical spot into either one of the land and the groove building up said track, selectively.

And, according to the present invention, within the seek control method as described in the above, preferably, it further comprises the steps of: producing a digitized signal of said tracking error signal; and measuring the period of said tracking error signal depending on elapsing time from rise-up or fall-down of said digitized signal, or preferably, the optical spot is pulled into either one of the land and the groove building up said track, selectively, depending on condition of the digitized signal of said tracking error signal, at the starting point of the pulling operation, through said tracking servo. Further, preferably, the condition of the digitized signal of said tracking error signal is "0" or "1" in level thereof.

Also, according to the present invention, within the seek control method as described in the above, preferably, determination is made, in advance, on whether the track is the land or the groove, which defines a target for movement of said optical pickup, and upon basis of a result of said determination is determined the starting point of pulling of the optical spot of said optical pickup, or preferably it further comprises the steps of: producing a digitized signal of said tracking error signal; measuring elapsing time of said digitized signal from rise-up or fall-down thereof, upon basis of the result of said determination; and thereby determining the starting point for pulling the optical spot of said optical pickup.

Further, according to the present invention, for also accomplishing the object mentioned above, there is also provided a seek control method of an optical disk recording/reproducing apparatus, for moving an optical spot onto an arbitrary track, moving an optical pickup into a radial direction thereof to an optical information recording medium, forming lands and grooves spirally on an information recording surface thereof, comprising the following steps of: producing a tracking error signal upon reflection of the optical spot incident upon from said optical pickup, with movement into a radial direction thereof; producing a signal through differentiation of said tracking error signal; producing a digitized signal of tracking error signal through digitizing of said tracking error signal; producing a digitized differential signal of the tracking error signal, through digitizing the differential signal of said tracking error signal; and starting pulling operation of the optical spot of said optical pickup through tracking servo when determining it, depending on said digitized tracking error signal and said digitized differential signal of the tracking error signal, when conducting the seek control.

Furthermore, according to the present invention, within the seek control method as described in the above, preferably, determination is made upon propriety of the pulling operation through said tracking servo, depending on said digitized signal of the tracking error signal, and upon timing of said pulling operation, depending on said digitized differential signal of the tracking error signal.

In addition thereto, according to the present invention, for also accomplishing the object mentioned above, there is further provided an optical disk recording/reproducing apparatus enabling to record or reproduce information onto/from an optical information recording medium, forming lands and grooves, thereby building up a spiral track on an information recording surface thereof, comprising: a rotary driving member which rotationally drives said optical information recording medium; an optical pickup, which is disposed opposing to the information recording surface of said optical information recording medium and is movable in a radial direction thereof; a pickup drive element, which drives said optical pickup; and a system controller, which controls at least said rotary driving member and said pickup drive element of said apparatus, and further said optical pickup device comprises: an element which produces a tracking error signal upon reflection of an optical spot upon the information recording surface of said optical information recording medium, wherein: measuring a period of the tracking error signal, which is generated with movement into the radial direction thereof, when conducting a seek control; determining a starting point for pulling the optical spot of said optical pickup into, through tracking servo, when the measured period of the tracking error signal fulfills a predetermined condition; and pulling the optical spot into either one of the land and the groove building up the track, selectively, thereby moving said optical pickup into the radial direction thereof, so as to move the optical spot from said optical pickup onto an arbitrary tack on said optical information recording/reproducing medium loaded therein.

Further, according to the present invention, within the optical disk recording/reproducing apparatus as described in the above, preferably, it further comprises an element, which produces a digitized signal of said tracking error signal, wherein the period of said tracking error signal is measured by elapsing time from rise-up or fall-down of the digitized signal produced by said element, or preferably, the optical spot is pulled into either one of the land and the groove building up said track, selectively, depending on condition of the digitized signal of said tracking error signal, which is produced by said producing element, at starting point of the pulling operation thereof through said tracking servo, or preferably, determination is made on either one the track is, between the land and the groove, as being a target, to which said optical pickup moves, and the starting point for pulling the optical spot of said optical pickup into, upon basis of a result of said determination.

Moreover, according to the present invention, within the optical disk recording/reproducing apparatus as described in the above, preferably, it further comprises an element, which produces a digitized signal of said tracking error signal, wherein the starting point for pulling the optical spot of said optical pickup into is determined by measuring elapsing time from rise-up of the digitized signal, which is produced from said producing element, or elapsing time from fall-down thereof, or preferably, said starting point for pulling the optical spot of said optical pickup into is determined by measuring period of "0" level of said digitized signal or period of "1" level thereof, upon basis of a result of said determination.

And, according to the present invention, also accomplishing the object mentioned above, there is further provided an optical disk recording/reproducing apparatus enabling to record or reproduce information onto/from an optical information recording medium, forming lands and grooves, thereby building up a spiral track on an information recording surface thereof, comprising: a rotary driving member which rotationally drives said optical information recording medium; an optical pickup, which is disposed opposing to the information recording surface of said optical information recording medium and is movable in a radial direction thereof; a pickup drive element, which drives said optical pickup; a system controller, which controls at least said rotary driving member and said pickup drive element of said apparatus; an element which produces a tracking error signal upon reflection of an optical spot upon the information recording surface of said optical information recording medium; an element which produces a differential signal of said tracking error signal; an element which produces a digitized signal of the tracking error signal through digitizing said tracking error signal; and an element which produces a digitized differential signal of the tracking error signal through digitizing the differential signal of said tracking error signal, wherein: starting of pulling operation of the optical spot of said optical pickup through said tracking servo is made depending on said digitized signal of said tracking error signal and the digitized differential signal of said tracking error signal, when determining that starting thereof, during when conducting a seek control.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE INVENTION

Hereinafter, embodiments according to the present invention will be fully explained by referring to the attached drawings.

First Embodiment

Figure 1:
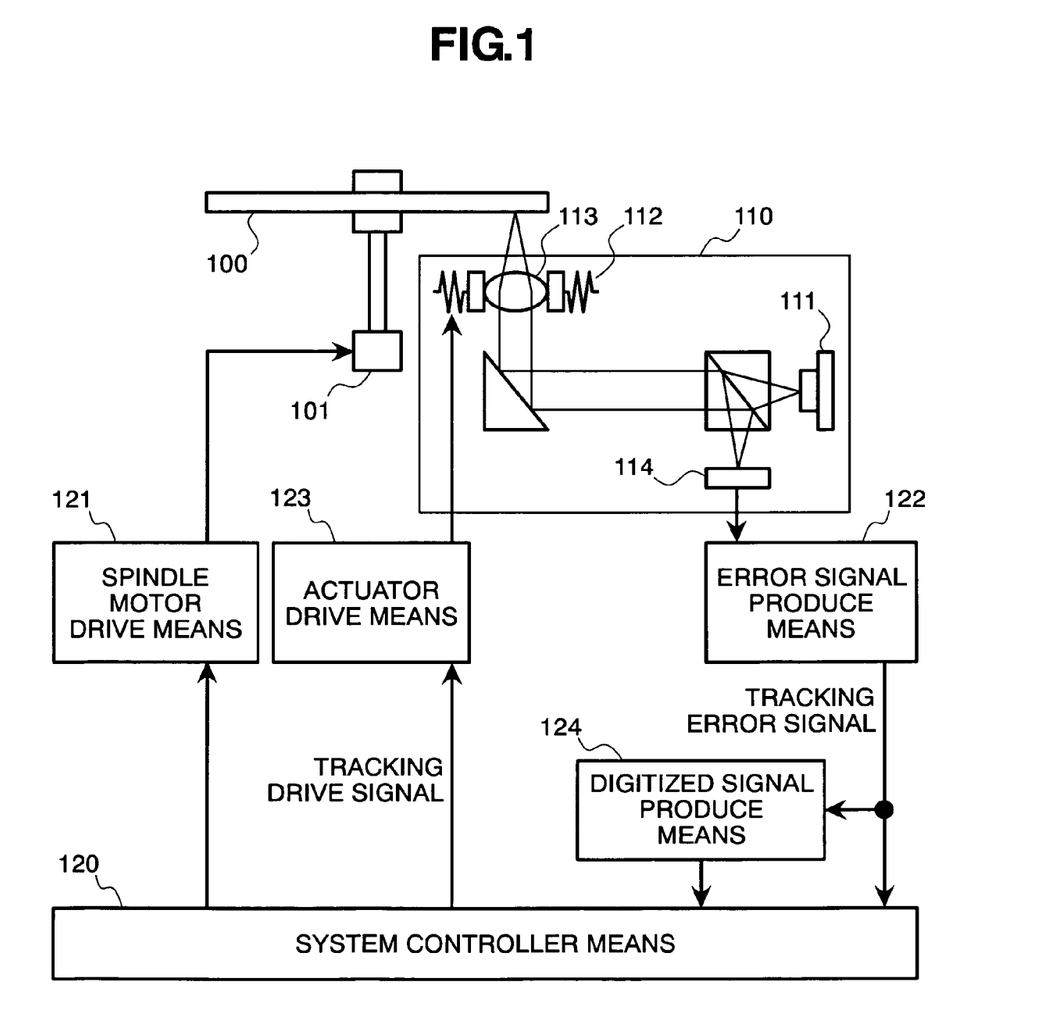
FIG. 1 is a block diagram for showing the structures of an optical disk recording/reproducing apparatus, briefly, according to a first embodiment of the present invention.

First of all, FIG. 1 attached herewith is a block diagram for showing the structures of an optical disk recording/reproducing apparatus, according to a first embodiment of the present invention, briefly, and in particular, mainly the constituent elements thereof for practicing the seek control method according to the present invention.

In the figure, a reference numeral 100 depicts an optical information recording medium, forming lands and grooves spirally on a recording surface thereof, such as, DVD-RAM, for example, representatively. This disc-like information recording medium, i.e., an optical disk 100 is loaded onto a holding member, such as, a turntable attached at a tip of a spindle motor 101, as is shown in the figure. On the other hand, this spindle motor 101 is rotationally driven with a predetermined control method, by means of a spindle motor drive means 121, so as to drive the optical disk 100, rotationally, at a desired rotation speed.

On the other hand, opposing to the information recording surface (i.e., the lower surface in the figure) of the optical disk 100, which is rotationally driven at the desired rotation speed in this manner, an optical pickup is provided to be movable into the radial direction of that optical disk, and this optical pickup 110 irradiates a laser beam generated from a laser light source 111, which is made up with a semiconductor laser, for example, upon the information recording surface of the optical disk 100 through an optical system including an objective lens 113 therein. On the other hand, a light reflected thereupon is incident upon a photo detector 114 made up with a phototransistor, etc., for example, also through the optical system including an objective lens 113 therein. Upon receipt of the reflection light from the information recording surface on the optical disk 100, the photo detector 114 converts the light received into an electric signal, thereby outputting it therefrom. However, inputting the signal outputted from this optical pickup 110, an error signal producing means 122 in the figure produces so-called a tracking error signal (i.e., TE signal), and further produces a digitized signal (i.e., TZC signal) digitized from that tracking error signal through a digitized signal producing means 124, so as to those signals to a system controller means 120, being constructed to comprise a CPU (i.e., a Central Processing Unit) therein.

And, inputting the tracking error signal form the error signal producing means 122 and the digitized signal (i.e., TZC signal) from the digitized signal producing means 124, and executing predetermined processes thereupon, the system controller means 120 outputs a tracking drive signal to an actuator drive means 123, and further it outputs a motor drive signal to the spindle motor drive means 121 mentioned above. In the structure thereof, this actuator drive means 123 includes so-called a driver circuit for use in control of the spindle motor, for example, for supplying a motor drive current. Also, as was mentioned above, FIG. 1 briefly shows the structures of the optical disk recording/reproducing apparatus, but mainly the constituent elements for practicing the seek control method; therefore, not showing other constituent element therein. However, for the person skilled in the art, it is apparent that, also in the similar manner thereto, necessary control signals are outputted to necessary constituent elements, while inputting signals from necessary constituent elements to execute the predetermined processes thereupon.

Also, the optical pickup 110 mentioned above is able to move, freely, into the radial direction of the disc-like optical disk 100, by means of a driving mechanism not shown in the figure (for example, including a motor, a slide rail, rack-and-pinion, etc.), and is further movable into a direction perpendicular to the information recording surface on the optical disk 100, by means of an actuator (including a voice coil, etc., for example) indicated by a reference numeral 112 in the figure. And, the actuator drive means 123 controls such the driving mechanism and the actuator as was mentioned above, appropriately. Thus, within the optical disk recording/reproducing apparatus, the explanation on the structures thereof was made in the above, inputting the tracking error signal form the error signal producing means 122 and the digitized signal (i.e., TZC signal) from the digitized signal producing means 124, the system controller means 120 outputs the tracking drive signal; thereby executing the seek operation by moving the optical pickup 110 or the optical spot thereof into the radial direction of the optical disk, through the actuator drive means 123 mentioned above.

Next, explanation will be given hereinafter, upon the seek control method according to the present invention, which will be executed within the optical disk recording/reproducing apparatus mentioned above.

Figure 2:
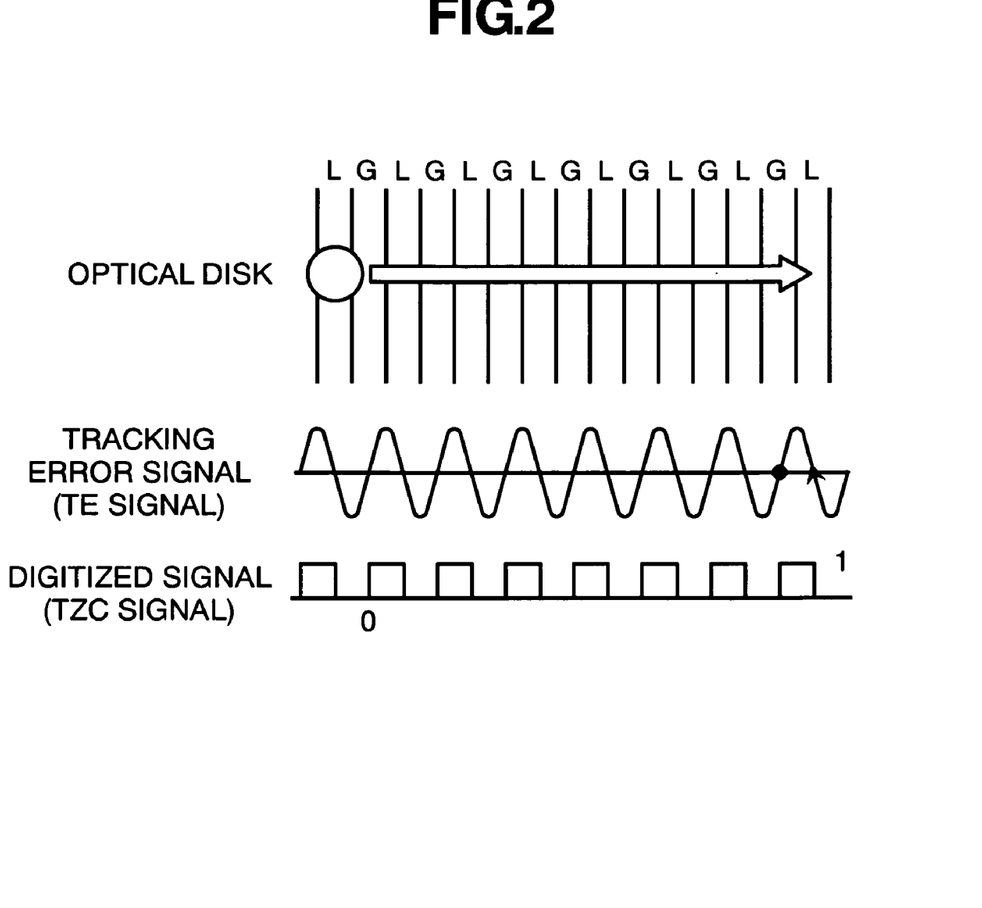
FIG. 2 is a view for showing signal waveforms at various portions within the optical disk recording/reproducing apparatus.

First, FIG. 2 attached herewith shows operations within various portions of the apparatus, during the seek operation thereof. Thus, as is shown in an upper portion of FIG. 2, when the optical spot of the optical pickup 110, which is indicted by "○" in the figure, moves into the radial direction on the optical disk (shown by an arrow in the figure) directing to a desired track, accompanying with this, the tracking error signal obtained from the error signal producing means 122 changes up and down, i.e., fluctuates in sinusoidal manner. Also, accompanying with the change of this tracking error signal, the digitized signal (i.e., TZC signal) obtained from the digitized signal producing means 124 also alters the level thereof between "HIGH (1)" and "LOW (0)". However, in this figure, a reference mark "L" depicts the land, and "G" the groove, respectively, which are formed spirally on the recording surface of the optical disk 100, as being the optical information recording medium, such as, DVD-RAM, representatively, for example. And, a reference mark "♦" in the figure depicts a starting point of executing the pulling operation (or, pull-operation) into tracking servo upon the groove (G), and a reference mark "▲" depicts a starting point of executing the pulling operation into tracking servo upon the land (L), respectively, at the time point when completing the seek operation. However, the starting of the pulling operation into tracking servo mentioned above has the same meaning of turning a tracking servo loop into "ON". Also, this tracking servo loop is constructed with the optical pickup 110, the error signal producing means 122, the digitized signal producing means 124, the system controller means 120 and the actuator drive means 123 mentioned above.

Figure 3:
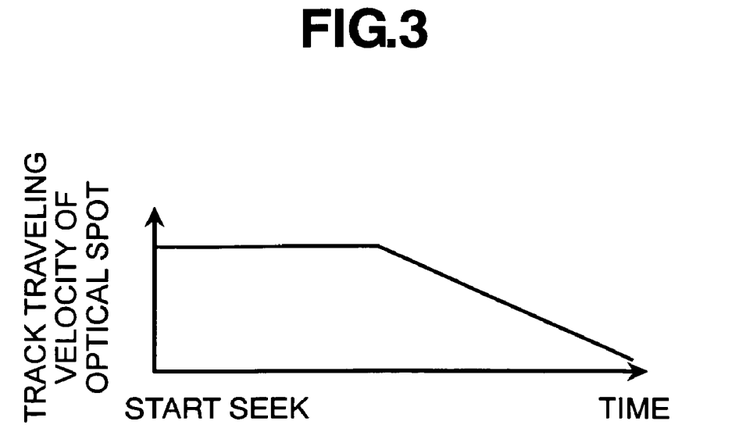
FIG. 3 is a graph for showing one example of velocity of traversing tracks of an optical spot, during the seek operation within the optical disk recording/reproducing apparatus.

And, FIG. 3 attached herewith shows an example of changes, in particular, on the track traversing speed of the optical pickup during the seek operation mentioned above. As is apparent from the figure, it can be seen that it is also composed of the three (3) stages; the acceleration stage (not shown in the figure) of applying the acceleration pulse onto the driving mechanism of the optical pickup, the constant speed stage of keeping moving velocity of the optical pickup at a desired value, and further the deceleration stage of reducing the moving velocity of the optical pickup, gradually (but, a deceleration pulse may be applied thereto). And, after completing the seek control, within the optical disk recording/reproducing apparatus, the tracking control is executed for bringing the optical spot of the optical pickup to follow the track, and thereby conducing the recording or reproducing on the target track, as is similar to that of the conventional art.

Then, according to the present invention, basically, for the purpose of pulling the optical spot into the tracking servo system after the seek operation, in particular, at time point when a velocity of the optical spot traversing tracks is lowered down to a predetermined value, detection is made upon the time point where period of the tracking error signal (i.e., TE signal) comes to a predetermined length (i.e., a period for starting the pulling operation) by measuring the time (or, period) elapsing from rise-up or fall-down of the digitized signal (i.e., TZC signal) of the tracking error signal mentioned above, and thereby applying that time point to be timing of pulling into the tracking servo loop.

<Method 1>

Following to the above, explanation will be made on the control operations in case of adopting the timing of pulling the optical spot through the tracking servo loop, according to the basis principle that was explained in the above.

As was mentioned above, when the seek operation is requested, the system controller means 120 produces an acceleration pulse (or, also a deceleration pulse, if necessary) upon basis of information of the track to be a target for moving the optical spot, and applies the acceleration pulse produced to the optical pickup 110 through the actuator drive means 123 (S11), and thereafter, it starts measurement upon the elapsing time (i.e., the period of "0" level of the TZC signal) from rise-up of the digitized signal (i.e., TZC signal) of the tracking error signal and the elapsing time (i.e., the period of "0" level of the TZC signal) from fall-down thereof (S12). However, after being accelerated up to a predetermined speed or velocity upon application of the acceleration pulse thereon, the optical pickup 110 is shifted into the deceleration stage of gradually reducing the moving velocity thereof, passing through the constant speed stage, as is shown in FIG. 3 mentioned above (however, the deceleration pulse may be applied, in this time). Further, on the waveform of the tracking error signal (i.e., TE signal) shown in FIG. 4 mentioned above, "○" indicates a point of changing the polarity of the signal indicative of polarity when pulling the optical spot onto the track, and "●" a time point when completing the pulling of the optical spot into the tracking servo loop.

Figure 4:
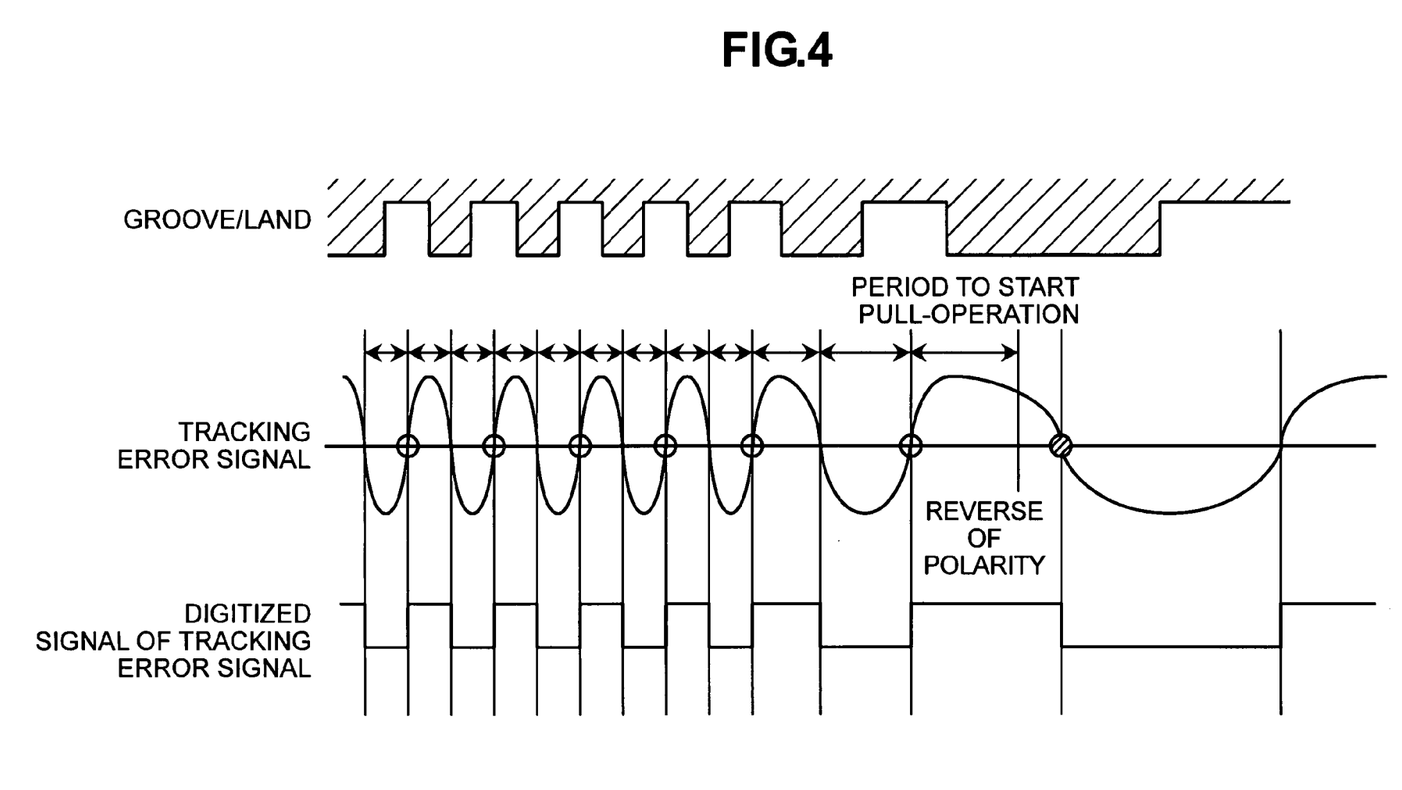
FIG. 4 is a view for explaining the pulling operation into tracking servo, with a method 1, during the seek operation within the optical disk recording/reproducing apparatus, according to the first embodiment mentioned above.
Figure 5:
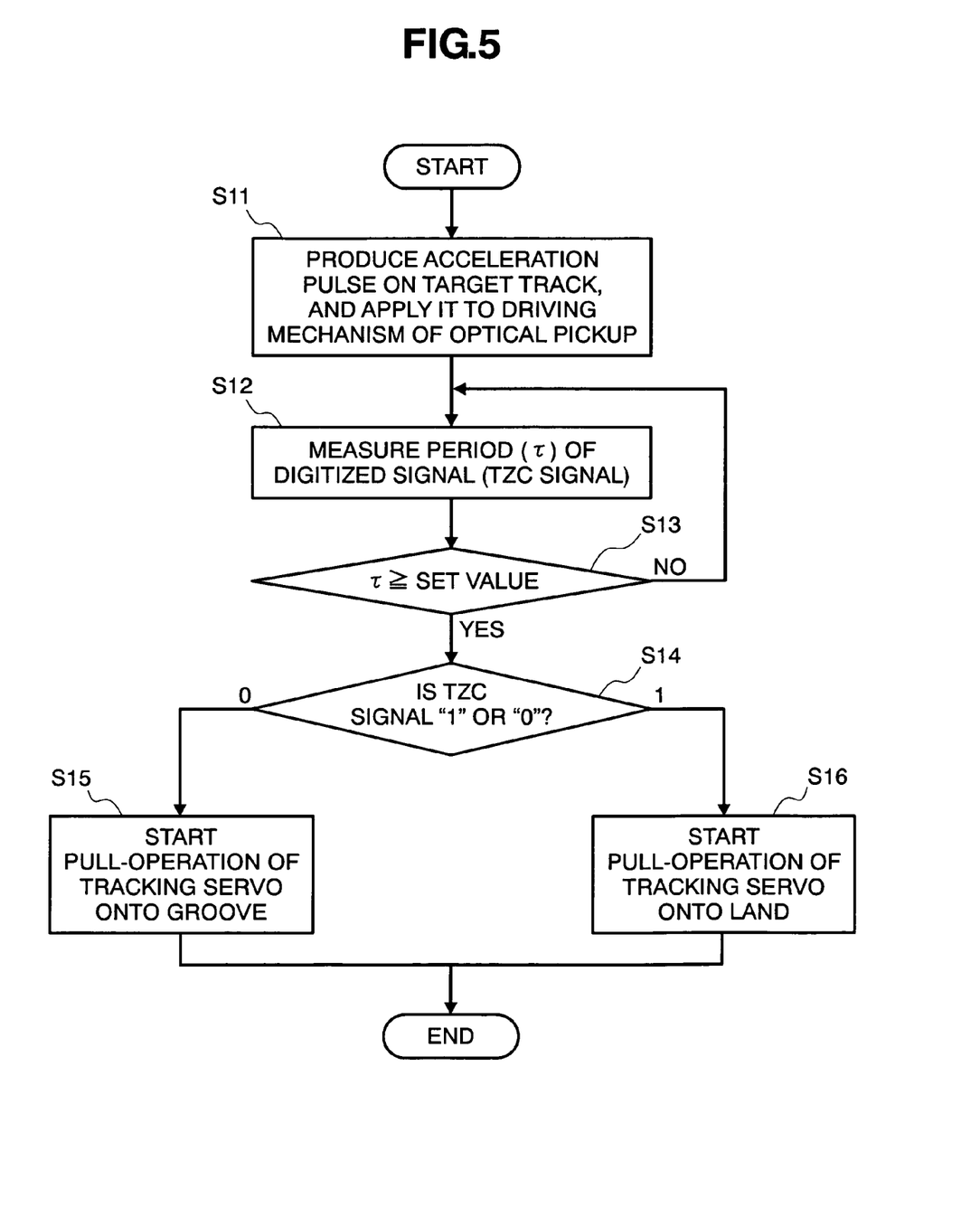
FIG. 5 is a flowchart for explaining the pulling operation into tracking servo, within the seek operation shown in FIG. 4 mentioned above.

As a result thereof, accompanying with shifting into the deceleration stage mentioned above, the period "τ" of the tracking error signal (i.e., TE signal) is gradually increased, as is shown in FIG. 4, and reaches up to a predetermined value (i.e., a set value). Then, as is shown in FIG. 5, this "τ" measured is compared with the set value (S13), and in case when determining that it is smaller than that set value (thus, the moving velocity is not yet sufficiently decelerated; see "NO" in the figure), the process turns back to the step (S12) mentioned above, again. On the other hand, in the step S13, when determining that the moving velocity is sufficiently decelerated so that the "τ" measured is equal to the set value or greater than that (see "YES" in the figure), then determination is made on which side the pulling of the optical spot should be made, i.e., the groove or the land, depending upon the condition of the digitized signal (i.e., TZC signal) at that time, as will be explained below.

Namely, determination is made upon the condition (i.e., the level) of the digitized signal (i.e., TZC signal) at the time point when determining that the "τ" is equal to or greater than the set value in the step S13. Thus, it is determined on whether the TZC signal is "0" or "1" in the level thereof (S14). As a result thereof, in case when it is determined to be "0" in the level (see "0" in the figure), the system controller means 120 starts the pulling operation (or pull-operation) of the optical spot onto the groove, by means of the tracking servo (S15). On the other hand, when it is determined to be "1" in the level (see "1" in the figure), it starts the pulling operation of the optical spot onto the land (S16), and thereby completing the pulling control of the optical spot within a series of the seek operations.

Herein, explanation will be made, again, by referring to FIG. 4. In this FIG. 4, after starting the seek operation, although it was on the side of the groove before, but since the condition of the digitized signal (i.e., TZC signal) is in "1" when the polarity of the tracking servo system satisfies the condition of the pulling operation, then the polarity of the tracking servo system is reversed, and the pulling operation of the optical spot is conducted on the side of land. With doing this, it is possible to carry out the pulling operation of the optical spot while keeping the movement into the advance direction.

With the seek control method according to the present invention, the details of which were mentioned above, it is possible to carry out the pulling control of the optical spot, to be executed after the seek operation, with certainty, even if the target track is the groove or the land, onto which the optical spot of the optical pickup 110 should move, crossing plural numbers of tracks formed on the information recording surface of the optical disk 100, and thereby achieving the optical disk recording/reproducing apparatus enabling the seek operation at high-speed and with stability.

<Method 2>

Figure 6:
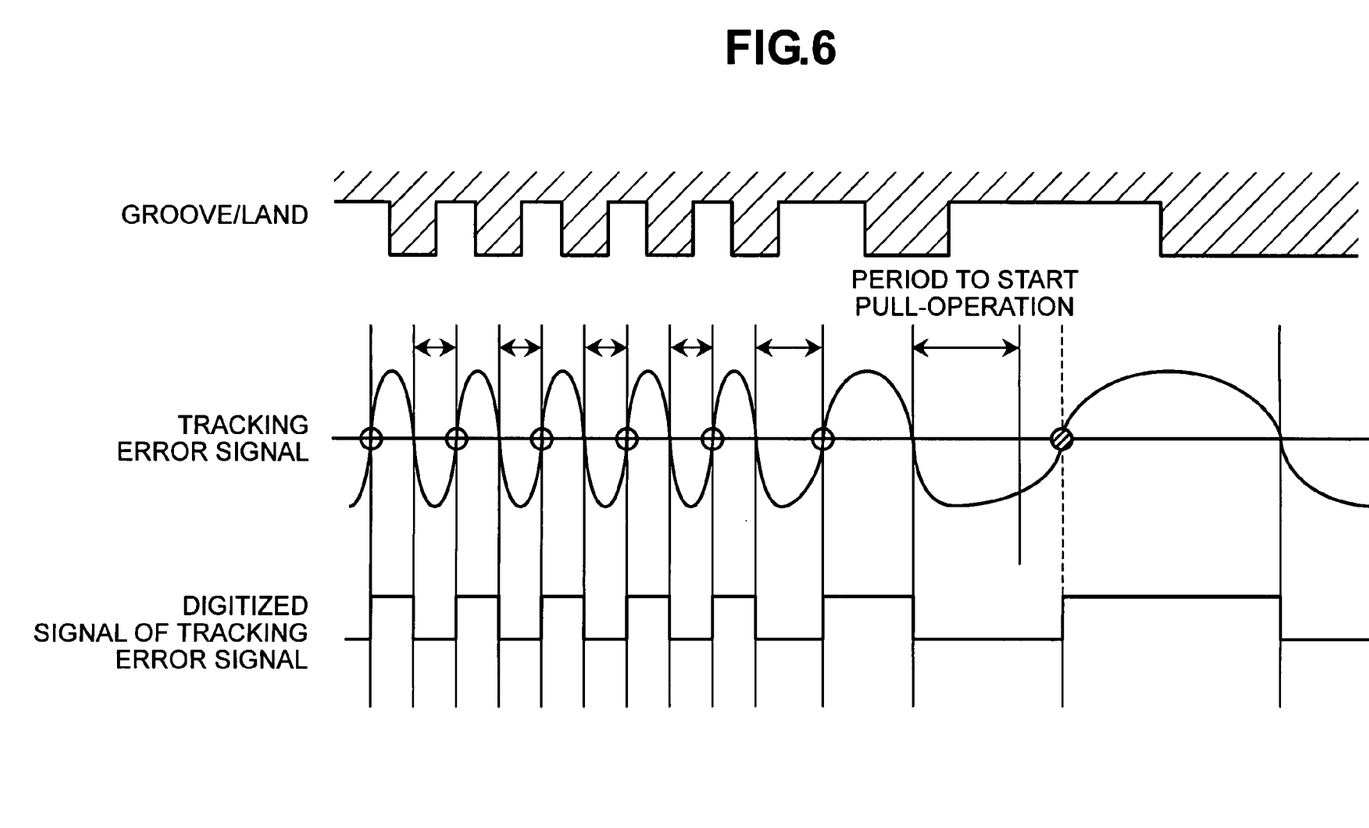
FIG. 6 is a view for explaining the pulling operation into tracking servo, with a method 2, during the seek operation within the optical disk recording/reproducing apparatus, according to the first embodiment mentioned above.

However, with the seek control method according to the method 1 mentioned above, determination is made on which side the pulling operation of the optical spot should be made, i.e., on the groove side or the land side, depending upon the condition of the digitized signal (i.e., TZC signal) at the timing when starting the pulling operation of the optical spot. For this reason, in particular, on the optical information recording medium, such as, DVD-RAM, for example, forming the lands and the grooves spirally on the recording surface thereof, there brings about a problem that the pulling operation of the optical spot cannot be always made onto the desired track, directly, for example, in case where data is written onto both the land and the groove and when it is already known of which the track of an address to be target thereof is the land or the track. Then, according to the method 2, which will be explained below, for dissolving such problem, thereby achieving the optical disk recording/reproducing apparatus enabling the seek operation at much higher speed and with stability much more. The details thereof will be explained hereinafter, by referring to FIGS. 6 and 7 attached herewith. However, the seek control method according to this method 2 can be practiced within the optical disk recording/reproducing apparatus, the structures of which was shown in FIG. 1 mentioned above, and therefore the expiation of such the apparatus will be omitted herein.

Figure 7:
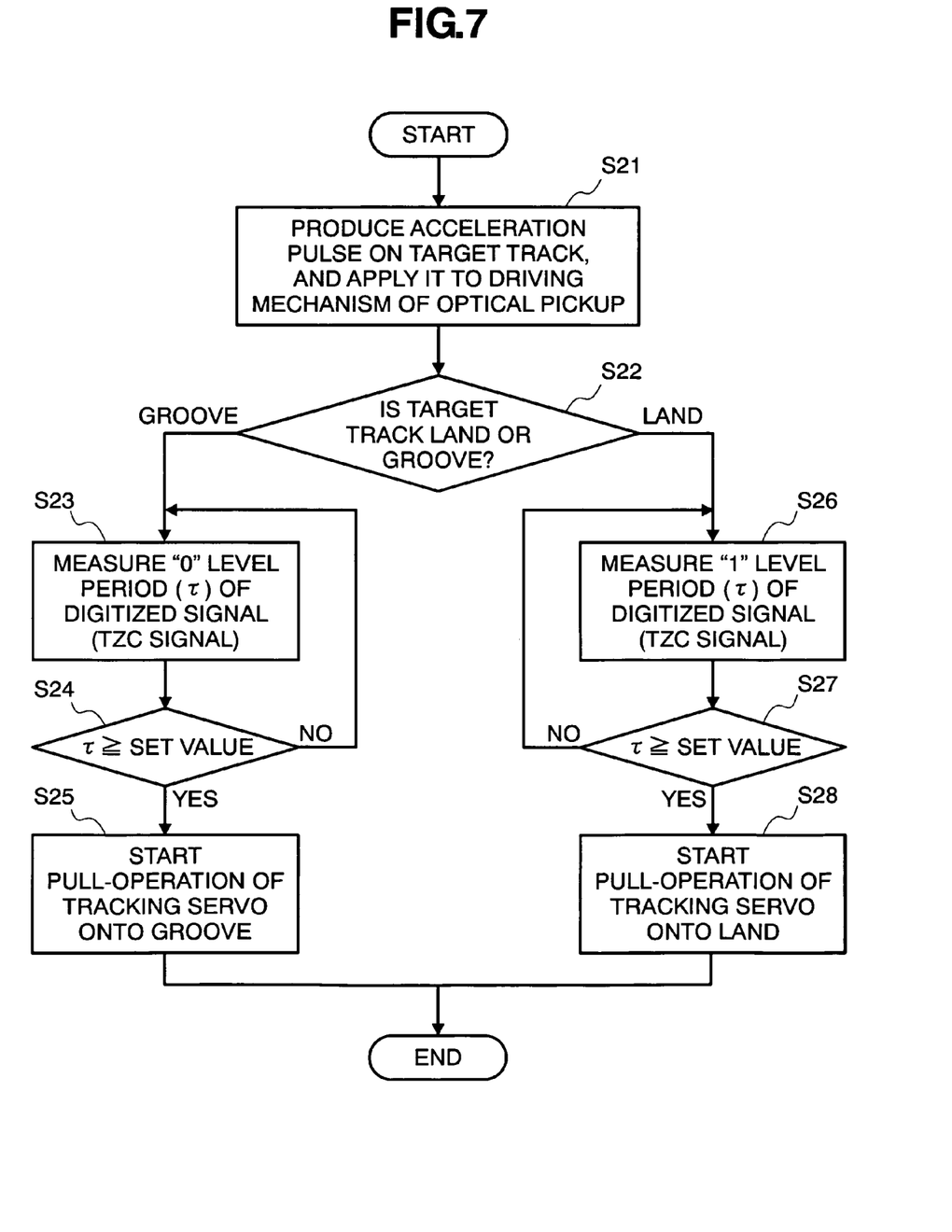
FIG. 7 is a flowchart for explaining the pulling operation into tracking servo, within the seek operation shown in FIG. 6 mentioned above.

According to the seek control method of the method 2, as is apparent from FIG. 7, first the system controller means 120 produces an acceleration pulse, etc., upon basis information about the track to be a target to which the optical spot should be moved, when the seek operation is requested, and applies the acceleration pulse produced to the optical pickup 110 through the actuator drive means 123 (S21). Further, in that instance, determination is made on whether that track targeted is the land or the groove (S22). Thereafter, depending upon a result of the determination, the operations are conducted, which will be mentioned below.

Thus, in case where it is determined to be the groove, as a result of the determination step S22 (i.e., "GROOVE" in the figure), measurement is conducted upon the elapsing time from fall-down of the digitized signal (i.e., TZC signal) of the tracking error signal, i.e., the period "τ" of the TZC signal in "0" level (S23). Thereafter, similar to that shown in FIG. 4 mentioned above, at the time point when detecting that "τ" comes to be equal to or greater than the set value (S24), the operation is started of pulling the optical spot onto the groove (S25). On the other hand, when determining to be the land (i.e., "LAND" in the figure), measurement is conducted upon the elapsing time from rise-up of the digitized signal (i.e., TZC signal) of the tracking error signal, i.e., the period "τ" of the TZC signal in "1" level (S26). Thereafter, in the similar manner, at the time point when detecting that "τ" comes to be equal to or greater than the set value (S27), the operation is started of pulling the optical spot onto the land (S28), and thereafter completing the pulling control of the optical spot within the series of seek operations.

As was mentioned above, determination is made on which one is the track targeted; i.e., the track or the groove, in advance, on basis of the information about the track to be a target onto which the optical spot should be moved, and upon the result thereof, the measurement is made on the period "τ" of "0" level, i.e., the elapsing time from the fall-down of the digitized signal (i.e., TZC signal) or the period "τ" of "1" level, i.e., the elapsing time from the rise-up thereof, selectively, thereby determining the timing for starting the pulling of the optical spot. With doing so, as is apparent from FIG. 4, possibility can be increased of achieving the pulling of the tracking servo onto the groove or the land of the target, during the seek operation. And, according to this method 2, in particular, on the optical information recording medium forming the lands and the grooves, spirally, on the recording surface, such as, DVD-RAM, for example, it is possible to obtain the optical disk recording/reproducing apparatus enabling the seek operation at much higher speed and with stability, even in case where data is recorded on both the land and the groove.

Second Embodiment

Within the embodiment 1 mentioned above, as the conditions for pulling into the tracking servo loop, determination is made upon the period of the tracking error signal (i.e., the period for starting the pulling operation), based on the elapsing time starting from the fall-down of the digitized signal (i.e., TZC signal), and further control is made on which one of the land or the groove the optical spot should be pulled into, with use of the condition when starting the pulling into the servo loop (in more details, depending on "1" or "0" level of the TZC signal). However, with the optical disk recording/reproducing apparatus according to the present second embodiment, not restricting only to that the conditions for pulling into the tracking servo loop be determined by the period of the tracking error signal (i.e., the starting period for pulling), but it is also possible to apply the condition(s) for pulling into, in the similar manner, when determining in accordance with other method(s). In other words, it is for showing a method, at what kind of timing should be the tracking servo loop turned "ON"; however, not depending on the condition for shifting into the pulling operation, but after satisfying the condition for shifting from the seek operation into the pulling operation (i.e., the condition for starting the pulling operation).

Figure 8:
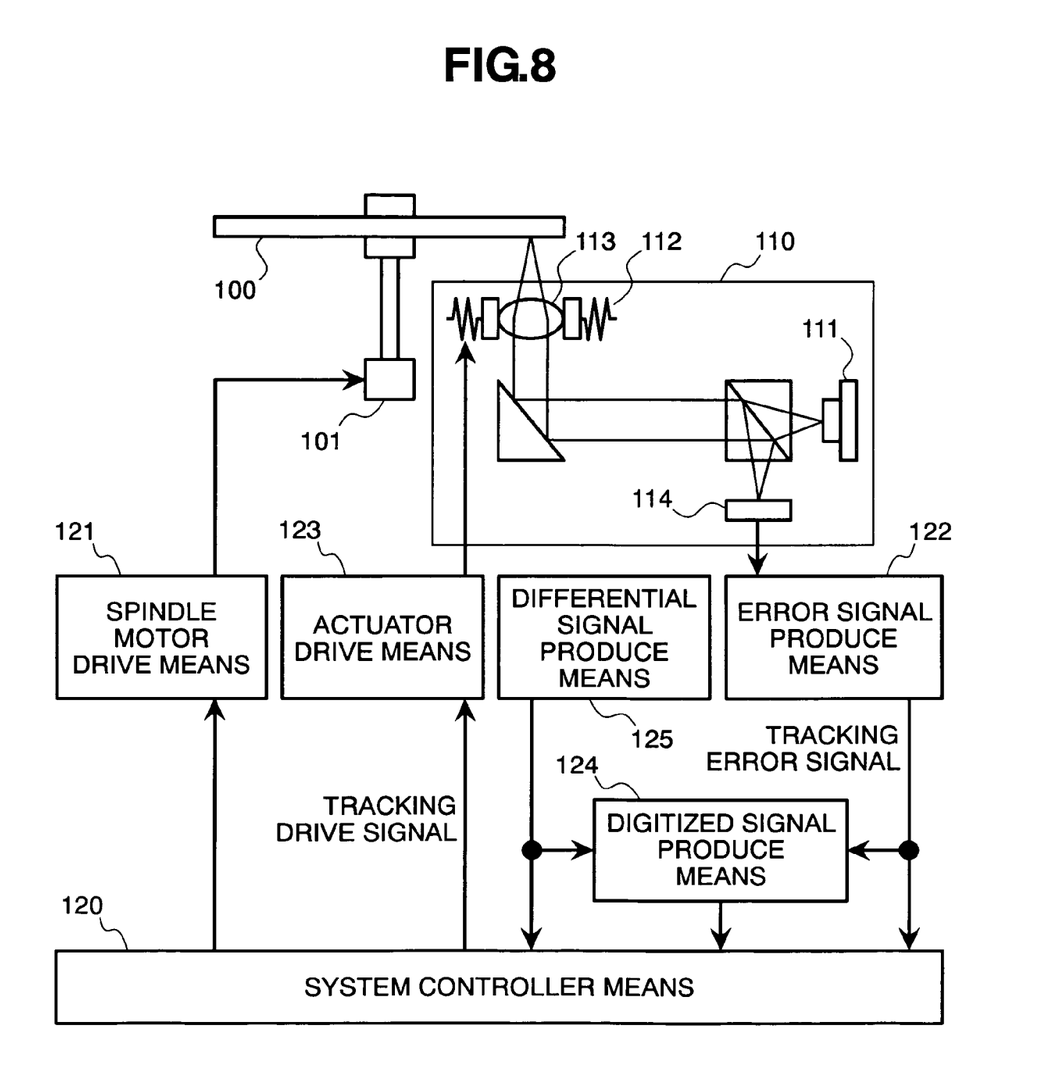
FIG. 8 is a block diagram for showing the structures of an optical disk recording/reproducing apparatus, briefly, according to a second embodiment of the present invention.

First, FIG. 8 is a view for showing the outlook structures of the optical disk recording/reproducing apparatus according the second embodiment mentioned above, and in particular, is a block diagram for showing the constituent elements, mainly, for practicing the seek control method according to the present invention. However, the constituent elements attached with the same reference numerals as in FIG. 1 shows the similar elements, respectively, and therefore explanations thereof will be omitted herein. And, as apparent from this FIG. 8, within the optical disk recording/reproducing apparatus according to the second embodiment, in addition to such the elements as mentioned above, there is provided a differential signal producing means 125, and a differential signal of the tracking error signal provided from this differential signal producing means 125 is inputted into the system controller means 120, and also to the digitized signal producing means 124, in the structures thereof. Thus, in this optical disk recording/reproducing apparatus according to the second embodiment, in addition to the tracking error signal and the digitized signal thereof, further a differential signal (i.e., TED signal) of the tracking error signal is produced by means of the differential signal producing means 125, and at the same time, a digitized signal (i.e., TDZC signal) is produced from the differential signal of the tracking error signal by means of the digitized signal producing means 124, wherein those signals are also inputted into the system controller means 120 mentioned above.

Next, explanation will be given on the seek operation within the optical disk recording/reproducing apparatus according the second embodiment, the structures of which were mentioned above, and in particular, the operation for controlling the timing of turning the tracking servo loop "ON", after determining that conditions are fulfilled to shift the operation from the seek operation into the pulling operation of the optical spot via the tracking servo loop (however, this determination on the conditions may be made upon the fact that the period of the tracking error signal exceeds a predetermined value, in the similar manner to that shown in the embodiment 1 mentioned above), by referring to the drawings attached herewith. Further, in this optical disk recording/reproducing apparatus according the second embodiment, as is similar to that shown in FIG. 3 mentioned above, the control upon the velocity of traversing tracks within the seek operation is also composed of the three (3) stages; i.e., the acceleration stage (not shown in the figure) of applying the acceleration pulse onto the driving mechanism of the optical pickup, the constant speed stage of keeping moving velocity of the optical pickup at a desired value, and further the deceleration stage of reducing the moving velocity of the optical pickup, gradually (but, a deceleration pulse may be applied thereto), in the similar manner to the general seek control.

Figure 9:
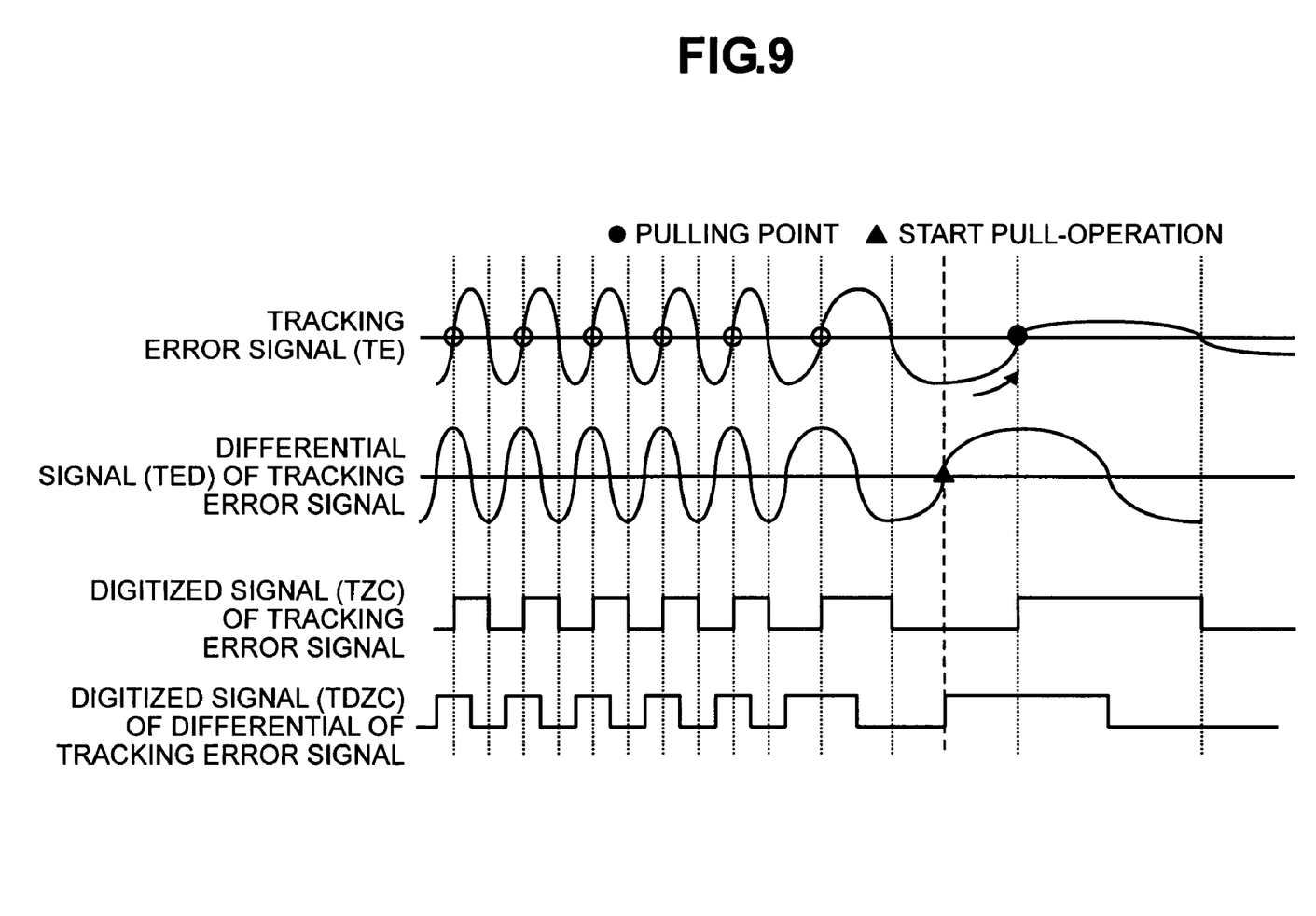
FIG. 9 is a view for explaining the pulling operation into tracking servo, with a method 1, during the seek operation within the optical disk recording/reproducing apparatus, according to the second embodiment mentioned above.

And, as is apparent in waveforms shown in FIG. 9 attached herewith, the condition for starting the pulling operation is determined upon the fact that the period of the tracking error signal exceeds the predetermined value, for example, and thereafter determination is made on shifting into the pulling operation of the optical spot with use of the tracking servo loop, according to the following steps (i.e., the timing for starting the pulling operation: the timing indicted by a mark "▲", as is shown by a broken line in the figure).

Figure 10:
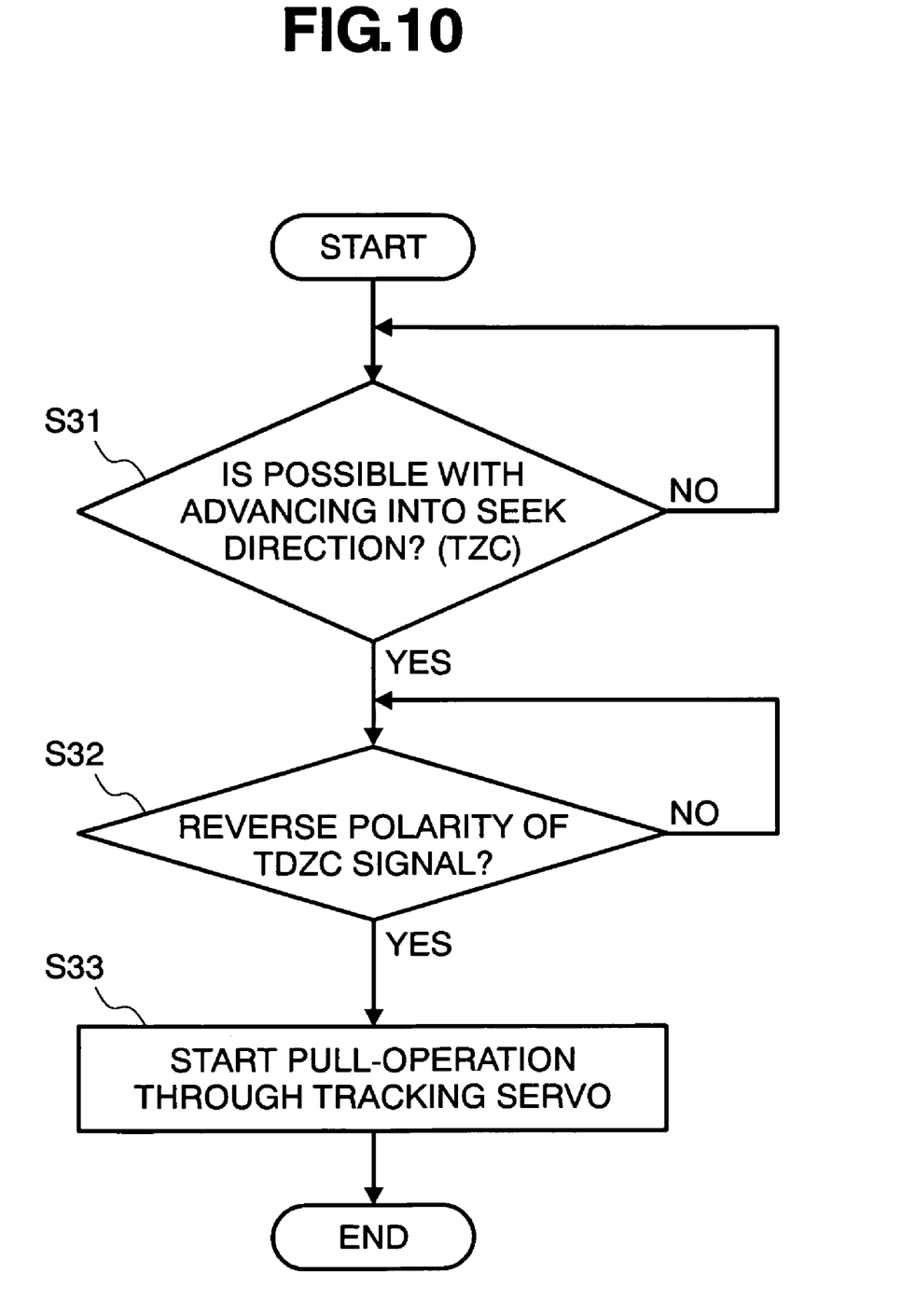
FIG. 10 a flowchart for explaining the pulling operation into tracking servo, during the seek operation within the optical disk recording/reproducing apparatus, according to the second embodiment mentioned above.

However, in case when it is determined that the condition is fulfilled, as a result of determination on the condition for starting the pulling operation, then the process shown in FIG. 10 attached herewith is started. In this process, first of all, determination is made on if it is possible or not, when trying to pull the optical spot by turning the tracking servo "ON" while keeping the optical spot advancing into direction same to the seek direction (S31), depending on the condition (i.e., in case of "1" or "0") of the signal obtained by digitizing the tracking error signal (i.e., TZC signal). Thus, as was explained in the embodiment 1 mentioned above, in case when the tracking servo is turned into "ON" under the condition where this TZC signal is in "0", then the optical spot is pulled into the groove side while advancing into the seek direction, but on the other hand, in case when the tracking servo is turned into "ON" under the condition where it is in "1", the optical spot is pulled into the groove side while moving into the opposite to the seek direction.

In more details thereof, it is confirmed that the TZC signal is in the condition "0" in case where the target track is the groove, on the other hand, that the TZC signal is in "1" in case where the target track is the land. On the contrary to this, in case where the TZC signal is in the condition "1" in spite of the target track is the groove, or in case where the TZC signal is in the condition "0" in spite of the target track is the land, it is impossible to pull the optical spot into the land or the groove while keeping it advancing into the seek direction, even if starting the pulling operation under such the condition. Then, upon basis of the information relating to the track to be the target of movement, it is determined whether the condition of the TZC signal is in conformity with or not.

Thereafter, detection is made (S32) upon the timing when the differential signal (i.e., TED signal) of the tracking error signal changes from negative (−) to positive (+), or from the positive (+) to negative (−) (i.e., the reversal of polarity), and at the timing detected, the tracking servo loop is turned "ON" (i.e., starts) (S33), thereby competing the process. With doing this, it is possible to turn the tracking servo "ON" while keeping the optical pickup advancing into the direction same to that of the seek operation.

However, also in such the case, it is preferable to turn the tracking servo loop "ON", in the timing thereof, at the same time when the optical spot reaches to a central portion in the radial direction on the track (i.e., the land or the groove), to which the optical track should be pulled into, inherently. However, in actual, when the tracking servo loop is turned "ON" after determining the exchange of the digitized signal (i.e., TZC signal) of the tracking error signal, for example, as is apparent from the waveforms shown in the figure, delay is generated therein. Then, applying the differential signal (i.e., TDZC signal) of the tracking error signal therein, it is preferable to determine the timing for turning the tracking servo loop "ON" by detecting the rise-up or the fall-down thereof.

As was mentioned above, with the optical disk recording/reproducing apparatus according to the second embodiment, it is possible to execute the pulling of tracking servo onto the track desired, with stability, even on the optical information recording medium forming the lands and the grooves, spirally, on the recording surface thereof, such as, DVD-RAM, for example. With this, it is possible to achieve the optical disk recording/reproducing apparatus enabling the seek operation at much higher speed and with stability much more.

As was fully explained in the above, with the seek control method according to the present invention, it is possible to execute the pulling control to be executed after the seek operation, with certainty, upon the optical spot, even if the target track is the groove or the land, onto which the optical spot of the optical pickup should be moved traversing the plural numbers of tracks formed on the information recording surface of the optical disk, and thereby brining about superior effect of achieving the optical disk recording/reproducing apparatus enabling the seek operation at high-speed and with stability.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A seek control method of an optical disk recording/reproducing apparatus, for moving an optical spot onto an arbitrary track, moving an optical pickup into a radial direction thereof to an optical information recording medium, forming lands and grooves spirally on an information recording surface thereof, comprising the following steps of:
   producing a tracking error signal upon reflection of the optical spot incident upon from said optical pickup, with movement into a radial direction thereof;
   producing a signal through differentiation of said tracking error signal;
   producing a digitized signal of tracking error signal through digitizing of said tracking error signal;
   producing a digitized differential signal of the tracking error signal, through digitizing the differential signal of said tracking error signal; and
   when conducting a seek control to move said optical spot across a plurality of tracks, starting a pulling operation of the optical spot of said optical pickup through a tracking servo, the starting of the pulling operation depending on said digitized tracking error signal and said digitized differential signal of the tracking error signal.

2. The seek control method, as described in the claim 1, wherein determination is made upon propriety of the pulling operation through said tracking servo, depending on said digitized signal of the tracking error signal, and upon timing of said pulling operation, depending on said digitized differential signal of the tracking error signal.

3. The seek control method of an optical disk recording/reproducing apparatus as described in claim 1, wherein starting the pulling operation of the optical spot of said optical pickup through said tracking servo is made depending on said differential signal of said tracking error signal acquired in the same seek control that conducts the pulling operation.

4. An optical disk recording/reproducing apparatus enabling to record or reproduce information onto/from an optical information recording medium, forming lands and grooves, thereby building up a spiral track on an information recording surface thereof, comprising:
   a rotary driving member which rotationally drives said optical information recording medium;
   an optical pickup, which is disposed opposing to the information recording surface of said optical information recording medium and is movable in a radial direction thereof;
   a pickup drive element, which drives said optical pickup;
   a system controller, which controls at least said rotary driving member and said pickup drive element of said apparatus;
   an element which produces a tracking error signal upon reflection of an optical spot upon the information recording surface of said optical information recording medium;
   an element which produces a differential signal of said tracking error signal;
   an element which produces a digitized signal of the tracking error signal through digitizing said tracking error signal; and
   an element which produces a digitized differential signal of the tracking error signal through digitizing the differential signal of said tracking error signal, wherein:
   when conducting a seek control to move said optical spot across a plurality of tracks, starting a pulling operation of the optical spot of said optical pickup through said tracking servo depending on said digitized signal of said tracking error signal and the digitized differential signal of said tracking error signal.

5. The optical disk recording/reproducing apparatus as described in claim 4, wherein starting the pulling operation of the optical spot of said optical pickup through said tracking servo is made depending on said differential signal of said tracking error signal acquired in the same seek control that conducts the pulling operation.

* * * * *